(12) United States Patent
Archak et al.

(10) Patent No.: US 11,195,222 B2
(45) Date of Patent: Dec. 7, 2021

(54) DETERMINING RECOMMENDED ITEMS FOR A SHOPPING LIST

(71) Applicant: Maplebear, Inc., San Francisco, CA (US)

(72) Inventors: Shrikar Archak, Newark, CA (US); Sharath Rao, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 16/725,503

(22) Filed: Dec. 23, 2019

(65) Prior Publication Data

US 2021/0192596 A1    Jun. 24, 2021

(51) Int. Cl.
  *G06Q 30/00*    (2012.01)
  *G06Q 30/06*    (2012.01)
  *G06F 16/248*   (2019.01)
  *G06F 16/2457*  (2019.01)

(52) U.S. Cl.
  CPC ....... *G06Q 30/0631* (2013.01); *G06F 16/248* (2019.01); *G06F 16/24578* (2019.01); *G06Q 30/0633* (2013.01); *G06Q 30/0641* (2013.01)

(58) Field of Classification Search
  None
  See application file for complete search history.

(56) References Cited

U.S. PATENT DOCUMENTS

| | | | | |
|---|---|---|---|---|
| 7,797,204 B2 * | 9/2010 | Balent | ................. | G06Q 10/087 705/28 |
| 9,165,320 B1 | 10/2015 | Belvin | | |
| 9,483,547 B1 | 11/2016 | Feller et al. | | |
| 9,536,237 B2 * | 1/2017 | Argue | ................. | G06Q 20/20 |
| 10,430,827 B2 * | 10/2019 | Zhou | ................. | G06Q 30/0269 |
| 2008/0249865 A1 * | 10/2008 | Angell | ................. | G06Q 30/06 705/14.34 |
| 2008/0300993 A1 * | 12/2008 | Rozenblatt | ............ | G06Q 30/06 705/23 |
| 2012/0322032 A1 * | 12/2012 | Smith | ................ | G09B 19/0092 434/127 |
| 2014/0249966 A1 * | 9/2014 | Zaragoza | ........... | G06Q 30/0635 705/26.81 |

(Continued)

OTHER PUBLICATIONS

Zheng Qin, "Introduction to E-commerce", 2009, Springer, springer. com (Year: 2009).*

(Continued)

*Primary Examiner* — Naeem U Haq
*Assistant Examiner* — Norman Donald Sutch, Jr.
(74) *Attorney, Agent, or Firm* — Fenwick & West LLP (57) ABSTRACT

In an online concierge system, a customer adds items to an online shopping cart. The online concierge system determines key ingredients from the items in the online shopping cart by mapping the items to generic items and removing non-ingredient items and staple items. The online concierge system retrieves recipes including at least one of the key ingredients. The online concierge system determines complementary ingredients based on the other ingredients in the recipes and calculates co-occurrence scores for the complementary ingredients. Using the co-occurrence scores, the online concierge system ranks the complementary ingredients and sends for display a subset of the complementary ingredients as recommended items.

16 Claims, 8 Drawing Sheets

(56) References Cited

U.S. PATENT DOCUMENTS

| | | | |
|---|---|---|---|
| 2015/0058065 A1* | 2/2015 | Pinel | G06Q 10/06313 |
| | | | 705/7.25 |
| 2017/0076355 A1 | 3/2017 | Argue et al. | |
| 2017/0139902 A1 | 5/2017 | Byron et al. | |
| 2018/0174188 A1* | 6/2018 | Wilkinson | G06Q 30/0261 |
| 2019/0188776 A1* | 6/2019 | Hammond | G06Q 30/0631 |
| 2019/0370876 A1* | 12/2019 | Greenberger | G06Q 30/0635 |

OTHER PUBLICATIONS

Tomonobu Ozaki; "Extraction of characteristic sets of ingredients and cooking actions on cuisine type"; 2017; 2017 31st International Conference on Advanced Information Networking and Applications Workshops (Year: 2017).*

PCT International Search Report and Written Opinion, PCT Application No. PCT/US20/65510, dated Mar. 10, 2021, 17 pages.

* cited by examiner

DETERMINING RECOMMENDED ITEMS FOR A SHOPPING LIST

BACKGROUND

This disclosure relates generally recommending items in an online concierge system. More particularly, the disclosure relates to determining recommended items based on items that have been added to an online shopping cart and their co-occurrence with other items in a set of recipes.

In current online systems and mobile applications, a customer creates a shopping list of items to be purchased form a retailer. To help a facilitate the customer's choice of items for the shopping list, the online system or mobile application may recommend items based on the customer's previous purchases. However, this does not account for the items the customer intends on purchasing, and the recommended items may not go well with the items already on the shopping list. For example, even if a customer previously purchased tofu, recommending tofu may not be useful to the customer when the other items on the customer's shopping list are ground beef and salmon, items which are typically not cooked in dishes with tofu. Therefore, a system for recommending items that are more relevant or related to the items already on the shopping list is necessary to give customers better suggestions of what to add to an order to create satisfying dishes.

SUMMARY

To determine recommended items for a customer, an online system analyzes items in the customer's online shopping cart. When a customer builds a shopping list of items in the online shopping cart, the online system suggests recommended items to add to the list based on the items already in the online shopping cart and/or items the customer previously ordered. The recommended items are based on complementary ingredients found in recipes containing some of the distinctive items (or key ingredients) in the customer's online shopping cart. The online system scores and ranks the complementary ingredients for display based on the co-occurrence of the complementary ingredients in the recipes with one or more of the key ingredients. The recipes may be selected based on relevancy to the customer beyond including the key ingredients, such as user characteristics and order history, as well as other non-user features, such as seasonal or global popularity.

More particularly, in some embodiments, the online system receives a list of items in a customer's online shopping cart. The online system determines key ingredients from the items in the online shopping cart by mapping the items to generic items and removing non-ingredient and staple items from the items. The online system retrieves recipes that include one or more of the key ingredients and uses the recipes to determine complementary ingredients, which are the ingredients in the recipes other than the key ingredients. The online system scores each complementary ingredient based on the frequency of occurrence of the complementary item in the retrieved recipes. Using the scores, the online system ranks the complementary ingredients and sends a subset of the complementary ingredients for display via a customer mobile application.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
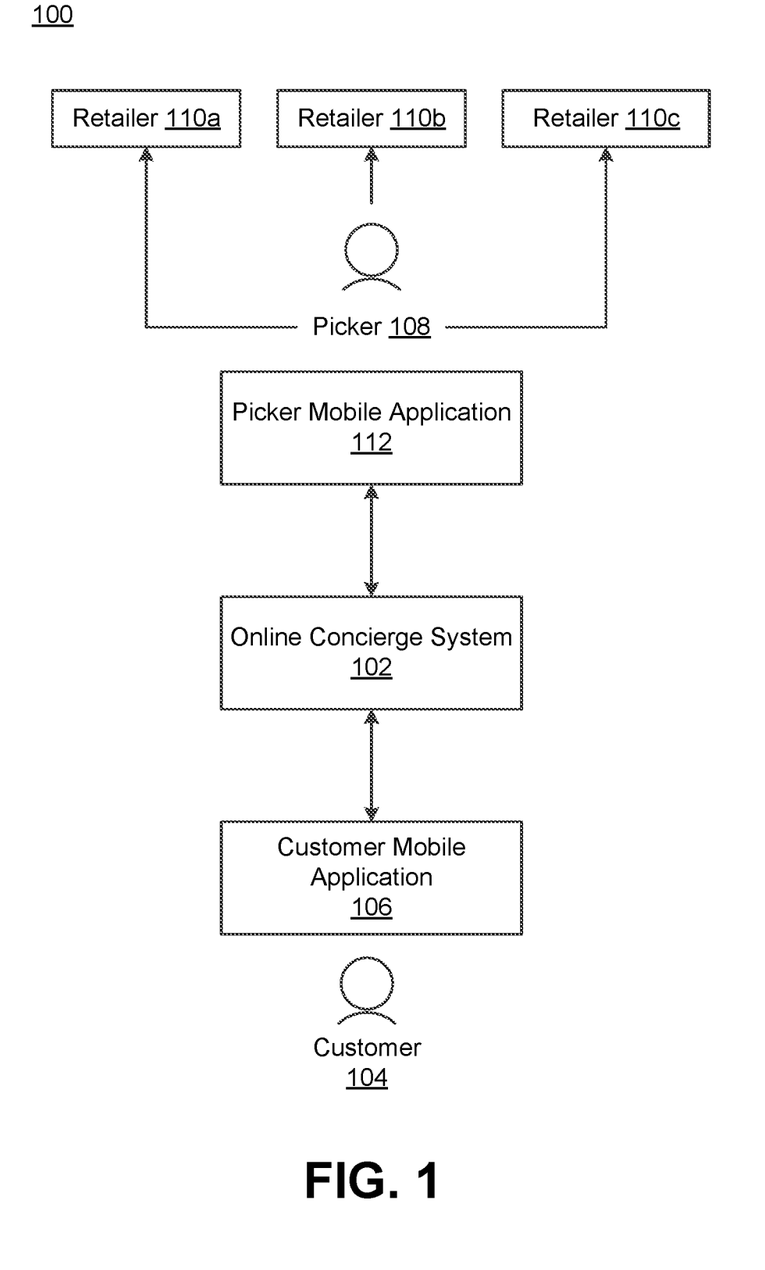
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures. Further, reference to using an online concierge system 102 for this invention is made throughout this specification. However, in other embodiments, another online system or mobile application may be used to determine recommended items for a shopping list.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include hundreds of retailers). The retailers 110 may be physical retailers, such as grocery stores, discount stores, department stores, etc., or non-public warehouses storing items that can be collected and delivered to customers. Each picker 108 fulfills an order received from the online concierge system 102 at one or more retailers 110, delivers the order to the customer 104, or performs both fulfillment and delivery. In one embodiment, pickers 108 make use of a picker mobile application 112 which is configured to interact with the online concierge system 102.

Online Concierge System

Figure 2:
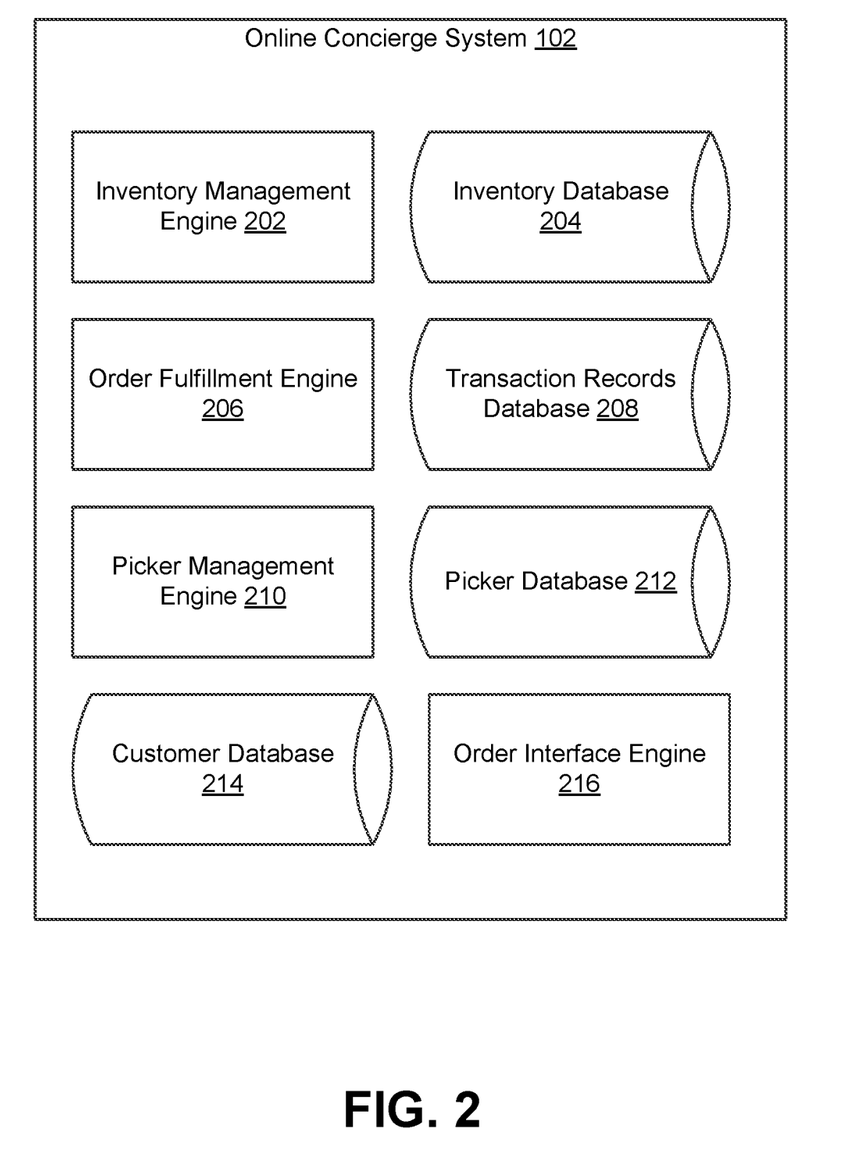
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory information may include quantity of an item in stock, images of the item, price of the item, and date of restock of the item. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with retailer 110. For example, after successful fulfillment of an order, the order fulfillment engine 206 may transmit a summary of the order to the appropriate retailer 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers, and the proximity to the delivery location. The picker management engine 210 then identifies one or more appropriate pickers 108 to fulfill the order based on one or more parameters, such as the pickers' proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers' picked the items in their assigned orders.

As part of fulfilling an order, the order fulfillment engine 206 and/or picker management engine 210 may access a customer database 214 which stores information describing each customer. This information could include each customer's name, address, gender, shopping preferences, favorite items, stored payment instruments, and so on. The online concierge system 102 also includes an order interface engine 216, which is further described in relation to FIG. 4.

Figure 3A:
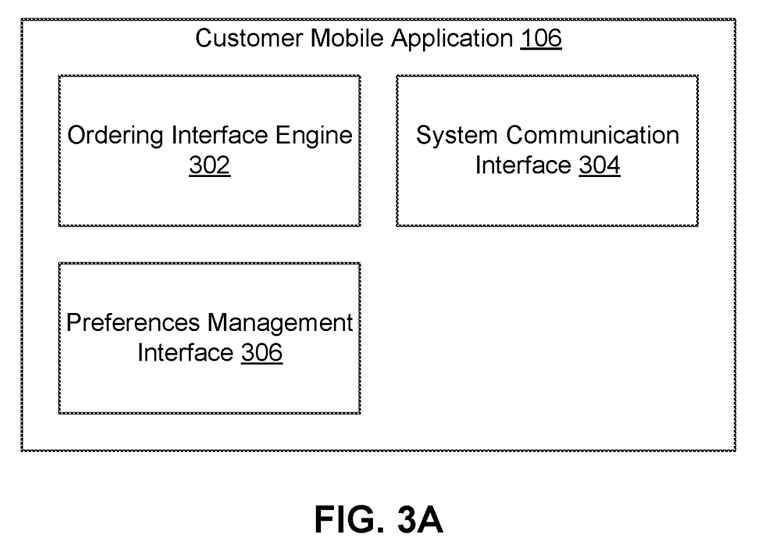
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface engine 302, which provides an interactive interface, known as a customer ordering interface, with which the customer 104 can browse through and select products and place an order.

Customers 104 may also use the customer ordering interface to message with pickers 108 and receive notifications regarding the status of their orders. Customers 104 may view their orders and communicate with pickers regarding an issue with an item in an order using the customer ordering interface. Customers 104 may also view and select recommended items to add to their online shopping cart via the customer ordering interface. Recommended items are items that would complement the items in a customer's online shopping cart, and the online concierge system determines recommended items by analyzing recipes with a subset of the items in the online shopping cart. For example, the order fulfillment engine 206 may determine, based on a list of items in a customer's online shopping cart, that "tomato" would complement the items given that the online shopping cart includes "basil" and "pasta." The process of determining recommended items is further described in relation to FIG. 4.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
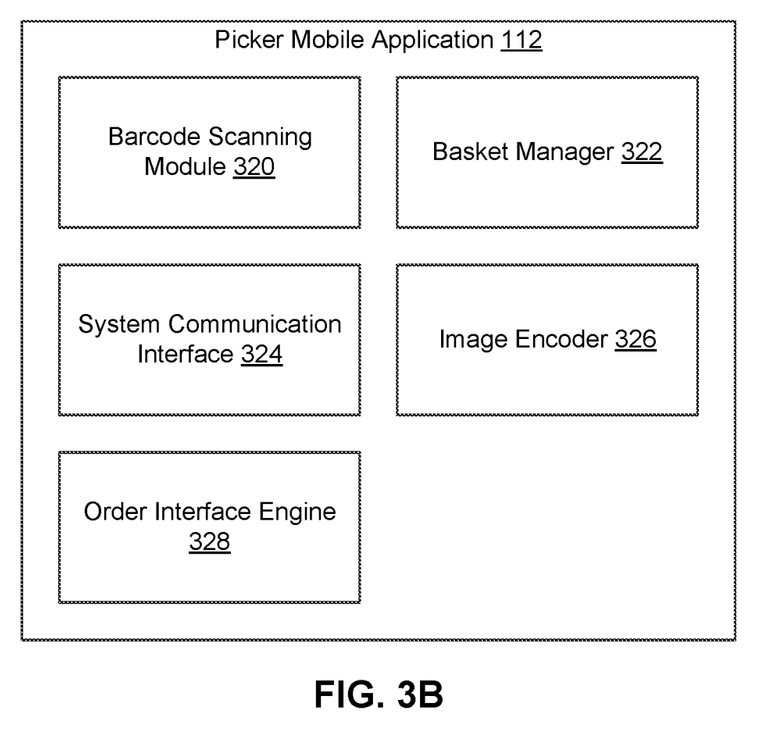
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket". In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer updates an order to include more or less items. The system communication interface may receive notifications and messages from the online concierge system 102 indicating information about an order or communications from a customer 104. The system communication interface 324 may send this information to the order interface engine 328, which generates a picker order interface. The picker order interface is an interactive interface through which pickers may message with customers 104 and receive notifications regarding the status of orders they are assigned.

Figure 4:
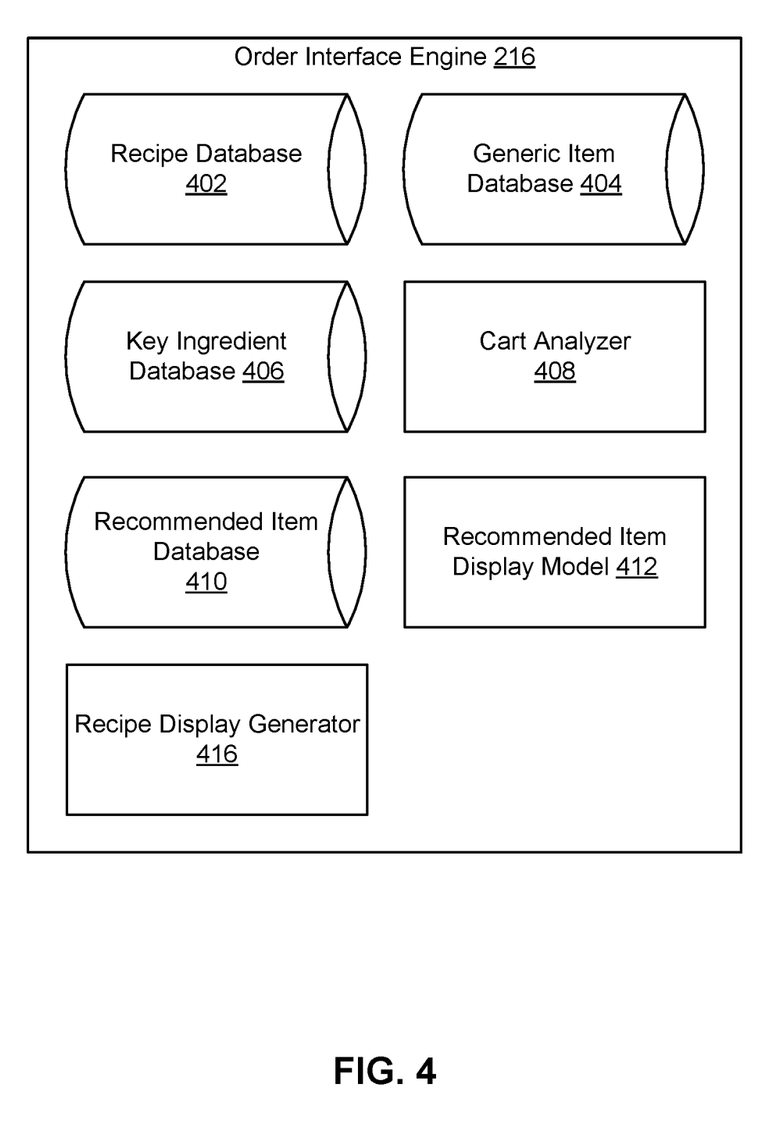
FIG. 4 is a block diagram of the order interface engine, according to one embodiment.

FIG. 4 is a block diagram of the order interface engine 216, according to one embodiment. The order interface engine 206 consists of recipe database 402, generic item database 404, key ingredient database 406, cart analyzer 408, recommended item database 410, recommended item display model 412, and a recipe display generator 414. In some embodiments, the order interface engine 216 has more or different components than those shown in FIG. 4. In other embodiments, the components shown in FIG. 4 may be combined or removed.

The recipe database 402 stores data describing recipes. Recipes describe a list of ingredients used to make a particular dish, and the recipe database may store recipes as mappings between titles of dishes and ingredients used in the dish. For example, the recipe database 402 may store "shredded beef burritos" in relation to "beef" and "avocado" and "mushroom beef stir fry" in relation to "beef" and "mushroom." In some embodiments, the recipe database 402 stores categories for each recipe, such as the cuisine type (e.g. "Asian Fusion," "Mexican," or "Vegan"). These cuisine types may be used to filter recipes that relate to information known about a customer. For example, if a customer 104 has looked at recipes under the cuisine type "Italian" more often than other cuisine types, the order interface engine 216 may weight "Italian" recipes more preferably than other cuisine types when determining recommended items for the customer 104. In other embodiments, customers 104 may enter information describing their dietary preferences (i.e., "allergic to peanuts" or "dislikes quinoa") or preferred cuisine types using the CMA 106, and the order interface engine 216 may determine recommended items using recipes that satisfy these dietary preferences (i.e., recipes that do not contain peanuts or quinoa).

The generic item database 404 stores item to generic item correlations. For example, the generic item database 404 stores items in relation to generic items in an index. A generic item describes a generic version of a particular item, such that the generic item does not identify the brand or sub-type of the item. For example, the generic item database 404 correlates items such as "Moo Moo Organic Milk," "Greener Pastures 2% Milk," and "Cow Bell Whole Milk" to the generic item "milk." This removes the connection to specific types of milk, like "Whole Milk," and specific brands of milk, like "Moo Moo." As another example, the item "Liquid Gold Chocolate Milk" is connected to the generic item "chocolate milk" rather than the generic item "milk" since, in most cases, chocolate milk is not used as a substitute for regular milk. In some embodiments, the generic item database 404 includes a set of rules or a machine-learned model that analyzes the name of a particular item to determine the associated generic item. For example, a rule for identifying items that fall within the generic item "milk" specifies that item descriptions that include the word "milk" along with a milkfat word (e.g., "skim," "2%," "whole"), but do not include flavor words (e.g., "chocolate," "strawberry," etc.) or milk substitute words (e.g., "soy," "oat," "almond"), are labeled as the generic item "milk." In some embodiments, the generic item database 404 stores generic items in relation to departments. Departments are categories for the generic items. Examples of departments may include "household," "frozen food," "deli," and "snacks." The cart analyzer 408, further described below, may use these categories to determine key ingredients in an online shopping cart.

The cart analyzer 408 analyzes items in an online shopping cart and determines recommended items for a user. The cart analyzer 408 receives items in a user's online shopping cart from the customer mobile application 106. The cart analyzer 408 determines a list of generic items by cross referencing the items in the online shopping cart with generic items in the generic item database 404. In some embodiments, the cart analyzer 408 also receives the department associated with each generic item, which may be used to determine key ingredients.

The cart analyzer 408 determines key ingredients from the list of generic items. Key ingredients are distinctive food items in the list of generic items. In some embodiments, key ingredients are less commonly bought than other generic items in the list. For example, the cart analyzer would use items like "chard" and "sweet potato" as key ingredients over staple items like "salt" and "olive oil," which are more commonly purchased by customers 104 and often used in recipes. The cart analyzer 408 uses filtering criteria the list of generic items by department to determine the key ingredients. In this embodiment, the cart analyzer 408 filters out household items and non-ingredients from the list of generic ingredients. Household items may be cleaning supplies like "dish soap" or bathroom supplies like "toothpaste" and non-ingredients may be premade foods like "frozen pizza" or snacks like "chocolate bar." In further embodiments, the cart analyzer 408 filters the list of generic items by department to remove non-food items. For example, generic items in the department "beverages" could be removed from the list of generic items, while generic items in the department "produce" would not. Each item in the filtered list of generic items becomes a key ingredient after the cart analyzer 408 applies the filtering criteria.

The cart analyzer 408 determines complementary ingredients using the list of key ingredients. Complementary ingredients are generic items that are often cooccur in recipes with one or more of the key ingredients. The cart analyzer 408 retrieves recipes from the recipe database 402 that include at least one of the key ingredients and determines a list of cooccurring ingredients, which are other generic items that are used in the recipes and are not in the online shopping cart. In some embodiments, the cart analyzer 408 only uses filtered recipes from the recipe database that account for the customer's 104 dietary preferences or highest weighted categories. The cart analyzer 408 may also filter the complementary ingredients to remove staple items that are often used to cook with, like types of oil or dairy products. The cart analyzer 408 may further filter the recipes based on the seasonal or global popularity of the items in the recipes as well as other customer characteristics and the customer's 104 order history. The cart analyzer 408 creates pairs of each complementary ingredient with each key ingredient and calculates a co-occurrence score for each pair using Equation 1 based on A, the number of recipes the complementary ingredient and key ingredient are both in, B, the number of recipes only including the key ingredient, and C, the number of recipes only including the complementary ingredient, which the cart analyzer 408 determines using the recipe database 402.

$$\frac{A}{BC} \qquad \text{Equation 1}$$

The co-occurrence score indicates how complementary the key ingredient and the complementary ingredient are. In some embodiments, a high co-occurrence score indicates that the key ingredient and the complementary ingredient are often used in recipes together and the complementary ingredient could be recommended to the customer 104 to purchase. In further embodiments, the cart analyzer 408 determines co-occurrence scores for multiple of the key ingredients with each complementary ingredient to refine which complementary ingredients to recommend to the customer 104. In that embodiment, A is the number of recipes that the multiple key ingredients and complementary ingredient coexist in, and Equation 1 further includes more terms multiplied in the denominator representing the number of recipes containing only each other key ingredient.

The cart analyzer 408 may also calculate a co-occurrence score for each key ingredient using Equation 2, which is the inverse of D, the number of retrieved recipes including the complementary ingredient.

$$\frac{1}{D} \qquad \text{Equation 2}$$

In some embodiments, the cart analyzer 408 uses Equation 2 instead of Equation 1 to determine a co-occurrence score for each complementary ingredient. In other embodiments, the cart analyzer combines the co-occurrences scores computed from Equation 1 with the co-occurrence score computed from Equation 2 for each complementary ingredient by addition or multiplication of the co-occurrence scores.

The cart analyzer 408 ranks the complementary ingredients to determine recommended items for the customer 104. The cart analyzer 408 ranks the complementary ingredients by co-occurrence score and selects complementary ingredients to be recommended items by rank. In some embodiments, the cart analyzer 408 ranks complementary ingredients for each key ingredient using the co-occurrence scores determined for that key ingredient. In other embodiments, the cart analyzer 408 determines multiple co-occurrence scores for each complementary ingredient paired with the key ingredients and ranks the complementary ingredients by their highest co-occurrence scores or combines the co-occurrence scores of each complementary ingredient into one co-occurrence score for ranking. The cart analyzer 408 selects a threshold percentage or threshold number of the highest ranked complementary ingredients to be recommended items. The cart analyzer 408 stores the selected recommended items in the recommended item database 410 in relation to the customer 104. The cart analyzer 408 may use the recommended items stored in the recommended item database along with the co-occurrence scores for future recommendations for as the customer 104 uses the online concierge system 102.

The recommended item display model 412 generates a customer ordering interface that displays the recommended items in the CMA 106. The recommended item display model 412 retrieves the recommended items from the recommended item database 410 and selects a subset of the recommended items for display based on the dimensions of the client device associated with the customer's 104 account on the CMA 106. The recommended item display model 412 retrieves information about each recommended item in the subset from the inventory database 204 to be shown in the display with each recommended item. Information may include an image of the recommended item and the price of the recommended item. The recommended item display model 412 may also generate widgets and buttons that the customer 104 may interact with to select the recommended item to add to the online shopping cart or select a quantity of the recommended item.

The recommended item display model 412 generates a customer ordering interface for the CMA 106 that shows suggested recipes determined for the customer 104. The recommended item display model 412 retrieves recipes from the recipe database 402 that include the key ingredients and the recommended items from the subset used by the recommended item display model 412. The recommended item display model 412 may order the recipes by the co-occurrence scores of the recommended items in the recipes and display a subset of the highest ranked recipes as suggested recipes. The recommended item display model 412 may display the key ingredients and recommended items included in each suggested recipe along with the title of the suggested recipe and a button allowing the user to view more information about the suggested recipe. In some embodiments, the recommended item display model 412 may display questions for the customer 104 to be used to filter the suggested recipes by the customer's 104 preferences.

Though FIG. 4 is explained in the context of using an online concierge system, this is just one example environment in which the invention can be used. The order interface engine 216 may be used in other systems to recommend items, and other embodiments may use an online system, mobile application, or any other system in which a customer is building a shopping list. In further embodiments, the recommended items are determined on a mobile device instead of an online system and may be displayed to an individual building a shopping list in another fashion than described in the figures.

Figure 5:
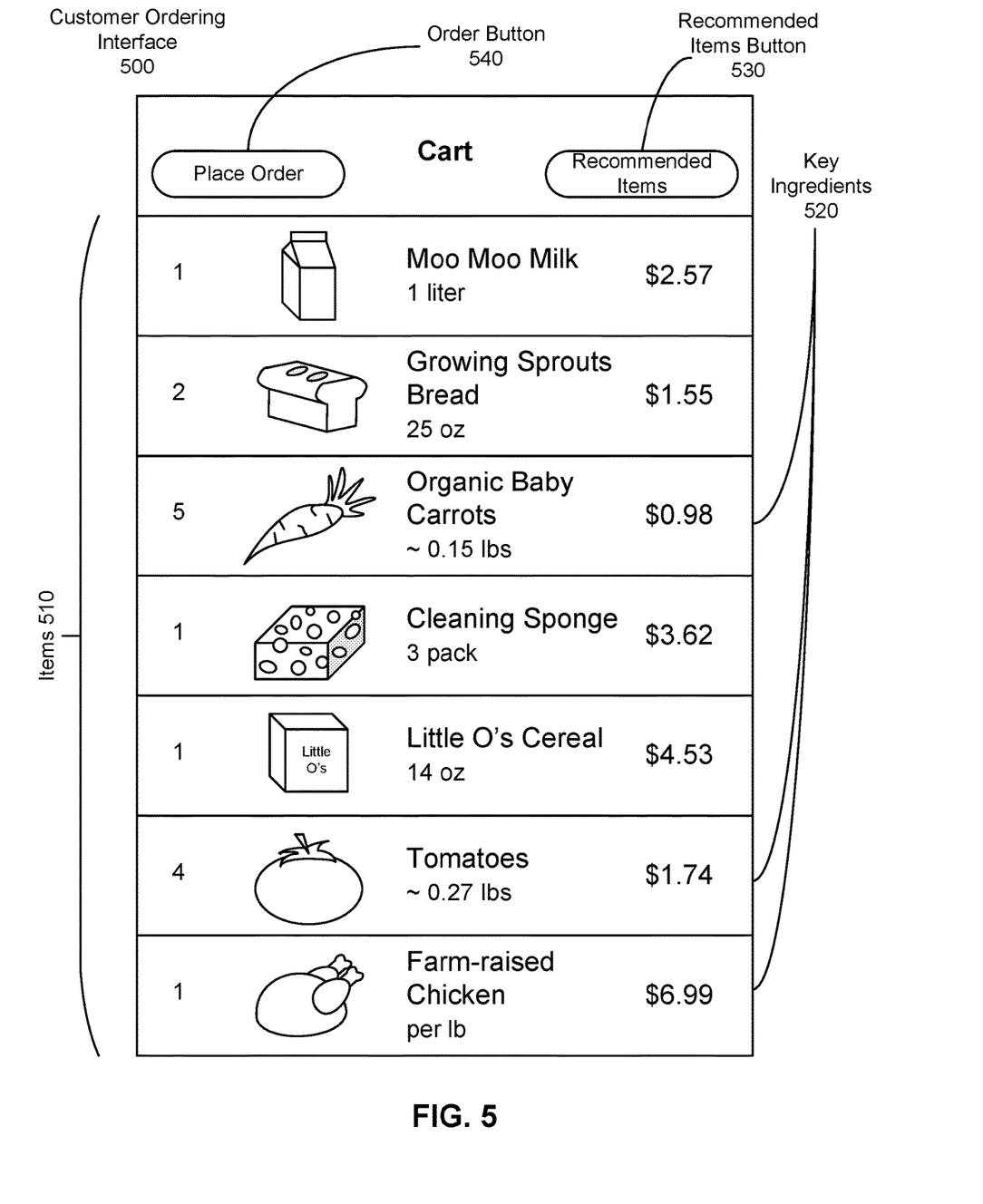
FIG. 5 is an example of a customer ordering interface displaying a list of items in an online shopping cart, according to one embodiment.

FIG. 5 is an example of a customer ordering interface 500 displaying a list of items 510 in an online shopping cart, according to one embodiment. The customer ordering interface 500 shows information about each item in the list of items, such as quantity in the cart, and price for the quantity. A customer 104 may interact with the customer ordering interface 500 to view more information about the items 510, place an order with the order button 540, or view recommended items with the recommended items button 530. The online concierge system 102 analyzes the list of items 510 in a customer's 104 online shopping cart to determine key ingredients 520 in the list of items 510. In this example, the key ingredients 520 are the generic item counterparts of "Organic Baby Carrots," "Tomatoes," and "Farm-raised Chicken" (e.g., "carrot," "tomato," and "chicken"). The online concierge system 102 maps the key ingredients 520 to their generic item counterparts, such as "carrot," "tomato," and "chicken," respectively. In other embodiments, the customer ordering interface 500 includes more interactive elements for the customer 104 to interact with.

Figure 6:
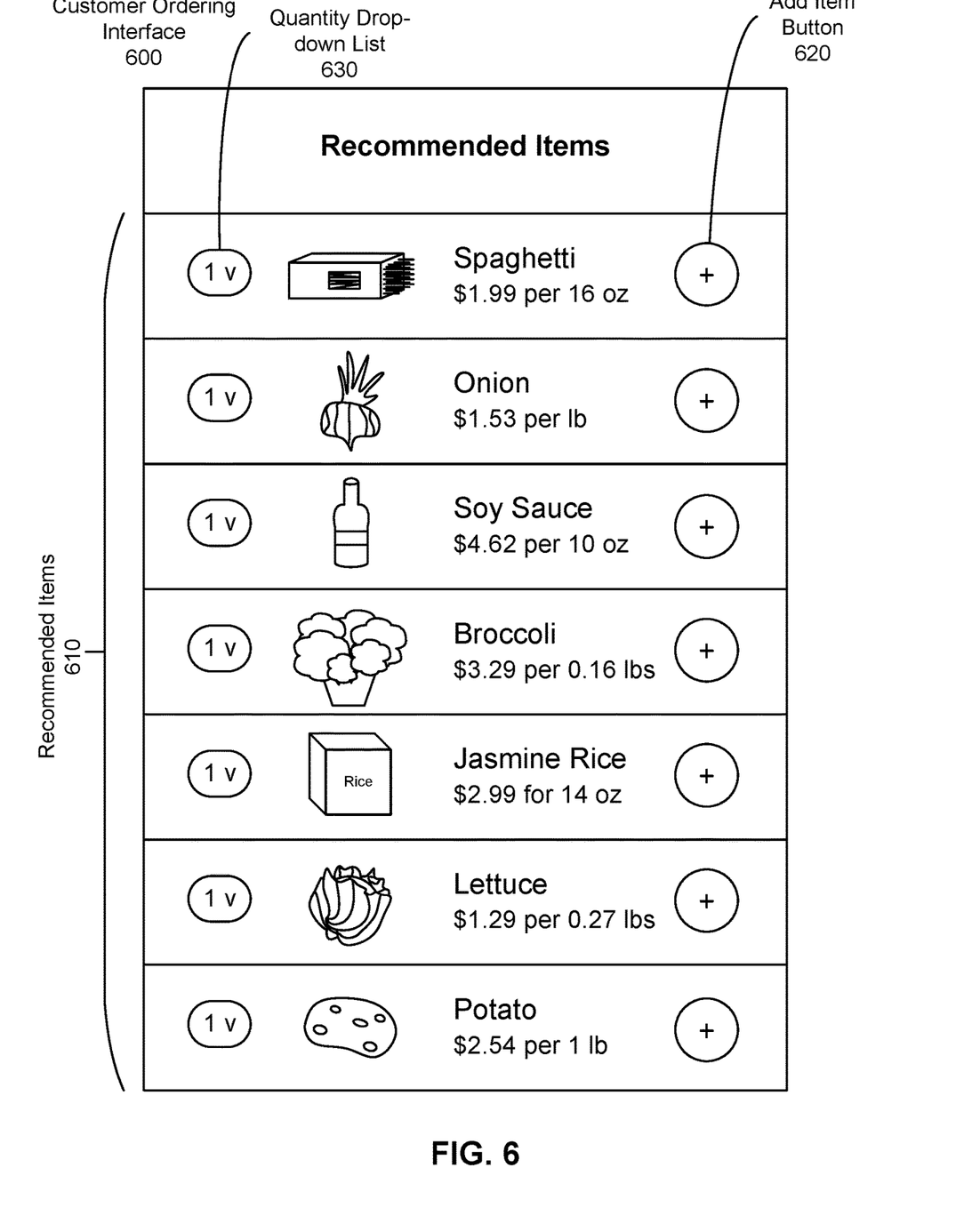
FIG. 6 is an example of a customer ordering interface depicting recommended items, according to one embodiment.

FIG. 6 is an example of a customer ordering interface 600 depicting recommended items 610, according to one embodiment. Continuing with the example from FIG. 5, the online concierge system 102 determines the recommend items 610 from the using the generic items counterparts mapped from the key ingredients 520. A customer 104 may interact with the customer ordering interface 600 to view more information about the recommended items 510, scroll through the list of recommended items 510, add a recommended item to their online shopping cart with the add item button 620, and select a quantity of the item with the quantity drop-down list 630. In other embodiments, the customer ordering interface 600 includes more interactive elements for the customer 104 to interact with to alter the contents of the online shopping cart.

Figure 7:
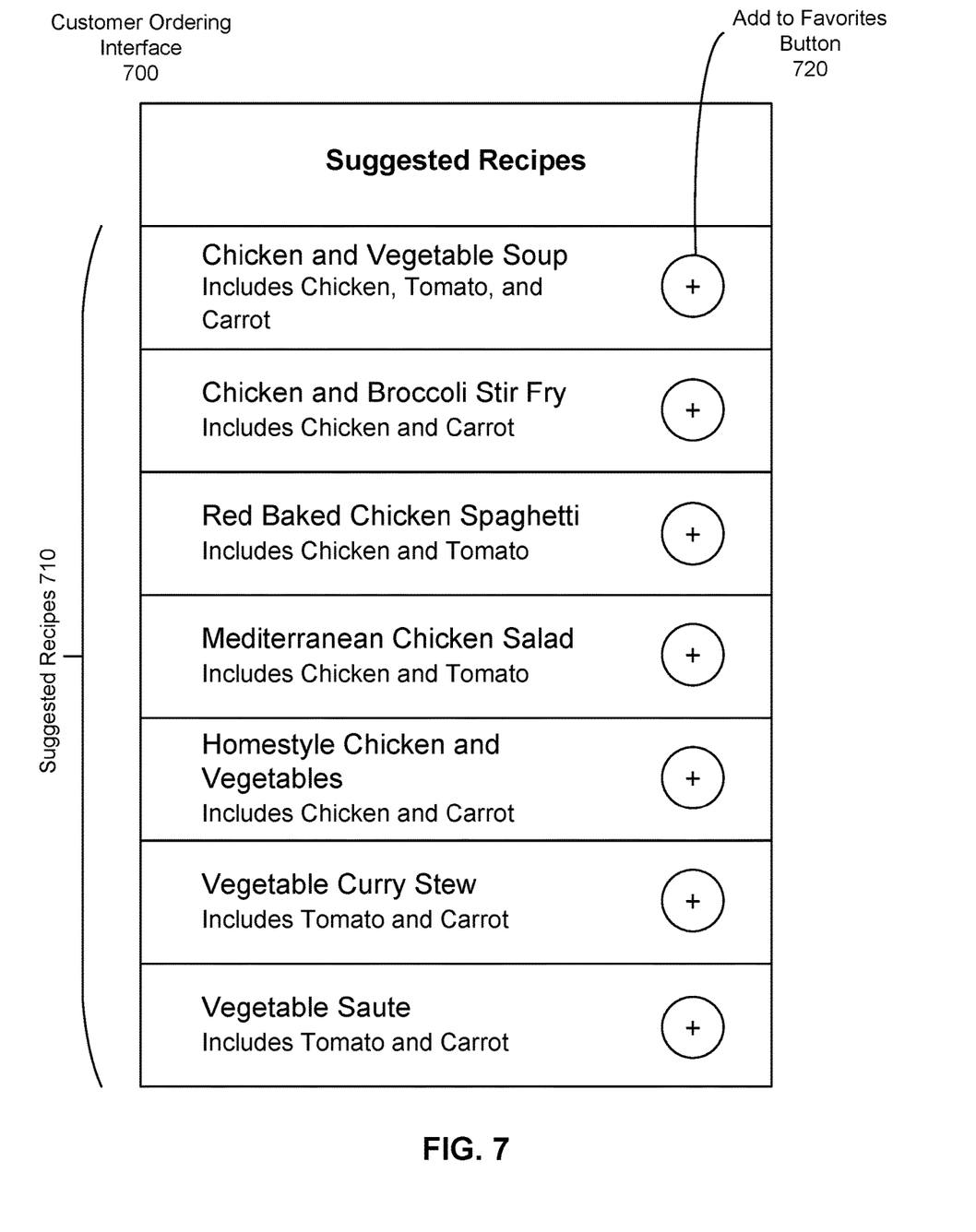
FIG. 7 is an example of a customer ordering interface displaying suggested recipes, according to one embodiment.

FIG. 7 is an example of a customer ordering interface 700 displaying suggested recipes, according to one embodiment. The customer ordering interface 700 displays suggested recipes 710 determined from the key ingredients described in the example related to FIG. 5. Each suggested recipe 710 includes at least one key ingredient. For example, the recipe "Chicken and Vegetable Soup" uses the key ingredients "chicken," "tomato," and "carrot." This recipe is shown at the top of the customer ordering interface 700 because it was the top ranked suggested recipe 710, given that the recipe uses three key ingredients while the other suggested recipes each only use two key ingredients. A customer can interact with the suggested recipes 710 to see more information about the recipe, such as instructions and ingredients, or use the add to favorites buttons to save suggested recipes to view later. The customer 104 can also scroll through the recipes in the customer ordering interface 700 to view more suggested recipes 710 not shown in FIG. 7.

Figure 8:
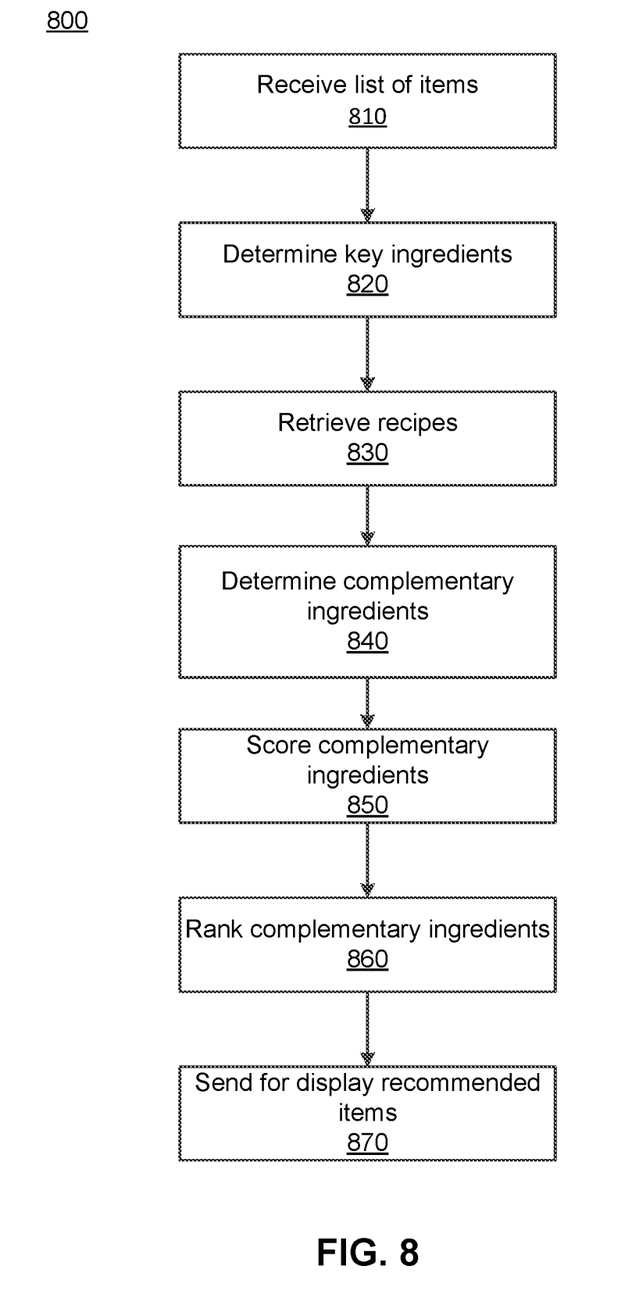
FIG. 8 is a flowchart illustrating a process for determining recommended items, according to one embodiment.

FIG. 8 is a flowchart illustrating a process 800 for determining recommended items, according to one embodiment. Though reference is made to the online concierge system 102 for this process 800, the process can be used by other online systems or mobile applications for building a shopping list. The online concierge system 102 receives 810 a list of items in a customer's 104 online shopping cart. The online concierge system 102 maps the items to their generic ingredient counterparts, which describe the generics version of each item (e.g., "cheese" instead of "fresh mozzarella cheese"). The online concierge system 102 determines 820 key ingredients from the generic items. The key ingredients describe distinctive generic items in the customer's 104 online shopping cart. For example, in an online shopping cart with the generic items "laundry detergent," "spinach," "butter," and "oat," the online concierge system 102 may determine that "spinach" and "oat," which are both food items, are key ingredients. Though "butter" is also a food item, "butter" is a staple ingredient used for many recipes, so the online concierge system 102 would not label it as a key ingredient.

The online concierge system 102 retrieves 830 recipes based on the key ingredients. The online concierge system accesses stored recipes and filters the recipes to retrieve recipes that include at least one of the key ingredients. The online concierge system 102 uses the recipes to determine 840 complementary ingredients for the key ingredients in the customer's 104 online shopping cart. The complementary ingredients are the ingredients from the retrieved recipes that are not key ingredients. In some embodiments, the online concierge system 102 filters the complementary ingredients to remove any staple (or non-distinctive) ingredients that may be commonly used in the recipes.

The online concierge system 102 scores 850 the complementary ingredients. In some embodiments, the online concierge system 102 determines a co-occurrence scores for each key ingredient-complementary ingredient pair using Equation 1. The online concierge system 102 may combine the co-occurrence scores for each complementary ingredient into one co-occurrence score or use the multiple co-occurrence scores for each complementary ingredient to rank 860 the complementary ingredients. In other embodiments, the online concierge system 102 uses Equation 2 to score 850 each complementary ingredient with one co-occurrence score based on the number of recipes including the complementary ingredient. The online concierge system 102 ranks 860 the complementary ingredients by co-occurrence score to determine which complementary ingredients to recommend to the customer 104. In some embodiments, the online concierge system 102 selects a threshold number of the complementary ingredients based on the ranking as recommended items, and in other embodiments, the online concierge system 102 uses all of the complementary ingredients as recommended items. In further embodiments, the online concierge system 102 selects a subset of the complementary ingredients and maps the complementary ingredients to in-store items. For example, the online concierge system 102 may map the complementary ingredient "lettuce" to "Organic Iceberg Lettuce" based on previous purchase history by the customer 104 or popular items at the retailer 110 that map to the generic item "lettuce." The online concierge system 102 sends 870 the recommended items for display by the CMA 106 in a scrollable list.

It is appreciated that although FIG. 8 illustrates a number of interactions according to one embodiment, the precise interactions and/or order of interactions may vary in different embodiments. For example, in some embodiments, the online concierge system 102 sends a subset of the retrieved recipes for display via the CMA 106. The subset of retrieved recipes may be the retrieved recipes including the highest ranked complementary ingredients or one recipe for each recommended item. In other embodiment, the online concierge system 102 further scores the complementary ingredients based on the historical frequency of occurrence in the customer's 104 online shopping cart. For example, the customer may have bought items corresponding to the generic item "beef" ten times and only bought items corresponding to the generic item "turkey" twice, so the online concierge system 102 may give the recommended items "beef" and "turkey" scores of ten and two, respectively, and subsequently rank "beef" higher than "turkey."

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
receiving, from a client device, a list of items in an online shopping cart associated with a user, wherein each item in the list is stored in an inventory of items available for the user to purchase, each item in the inventory associated with a user interface widget for adding the item to the online shopping cart;
determining a set of key ingredients from the list of items by:
mapping each item of the list of items to a generic item by applying a machine-learned model to each item, wherein the machine-learned model analyzes a name of the item to determine an associated generic item; and
removing staple items from the mapped generic items, wherein staple items are items commonly used in recipes;
retrieving recipes that contain one or more of the key ingredients;
determining a set of complementary ingredients from the recipes, wherein each complementary ingredient is different from the key ingredients;

scoring each of the set of complementary ingredients based on a frequency of co-occurrence of the complementary ingredient and each of the one or more key ingredients in the recipes;

ranking user interface widgets associated with each of the complementary ingredients based on the scoring, wherein user interface widgets of complementary ingredients that co-occur with one or more of the key ingredients in the recipes are ranked higher than user interface widgets of complementary ingredients that do not co-occur with one or more of the key ingredients in the recipes;

selecting one or more of the highest ranked user interface widgets to recommend to the user;

sending, for display via a user interface presented at the client device, the selected user interface widgets;

receiving, from the client device, a selection of a user interface widget; and adding an item associated with the user interface widget to the list of items in the online shopping cart.

2. The method of claim 1, further comprising:
removing non-ingredients from the mapped generic items, wherein non-ingredients include premade foods.

3. The method of claim 1, wherein the score for each complementary ingredient is inversely related to the number of the recipes including the complementary ingredient.

4. The method of claim 1, further comprising:
sending, for display via the user interface at the client device, a subset of recipes including the highest ranked complementary ingredient.

5. The method of claim 1, wherein the complementary ingredients are further scored based on a frequency of occurrence in an online shopping cart associated with the user of the client device.

6. The method of claim 1, wherein the score for each complementary ingredient is based on a first number of the recipes including the complementary ingredient, a second number of the recipes including a key ingredient of the key ingredients, and a third number of recipes including the complementary ingredient and the key ingredient.

7. The method of claim 1, further comprising:
receiving a request from the client device to purchase the list of items in the online shopping cart.

8. A non-transitory computer-readable storage medium comprising instructions executable by a processor, the instructions comprising:
instructions for receiving, from a client device, a list of items in an online shopping cart associated with a user, wherein each item in the list is stored in an inventory of items available for the user to purchase, each item in the inventory associated with a user interface widget for adding the item to the online shopping cart;
instructions for determining key ingredients from the list of items, the instructions further comprising:
instructions for mapping each item of the list of items to a generic item by applying a machine-learned model to each item, wherein the machine-learned model analyzes a name of the item to determine an associated generic item; and
instructions for removing staple items from the mapped generic items, wherein staple items are items commonly used in recipes;
instructions for retrieving recipes that contain one or more of the key ingredients;
instructions for determining a set of complementary ingredients from the recipes, wherein each complementary ingredient is different from the key ingredients;
instructions for scoring each of the set of complementary ingredients based on frequency of co-occurrence of the complementary ingredient and each of the one or more key ingredients in the recipes;
instructions for ranking user interface widgets associated with each of the complementary ingredients based on the scoring, wherein user interface widgets of complementary ingredients that co-occur with one or more of the key ingredients in the recipes are ranked higher than user interface widgets of complementary ingredients that do not co-occur with one or more of the key ingredients in the recipes;
instructions for selecting one or more of the highest ranked user interface widgets to recommend to the user;
instructions for sending, for display via a user interface presented at the client device, the selected user interface widgets;
instructions for receiving, from the client device, a selection of a user interface widget; and
instructions for adding an item associated with the user interface widget to the list of items in the online shopping cart.

9. The non-transitory computer-readable storage medium of claim 8, the instructions further comprising:
instructions for removing non-ingredients from the mapped generic items, wherein non-ingredients include premade foods.

10. The non-transitory computer-readable storage medium of claim 8, wherein the score for each complementary ingredient is the inverse of the number of the recipes including the complementary ingredient.

11. The non-transitory computer-readable storage medium of claim 8, the instructions further comprising:
sending, for display via the user interface at the client device, a subset of recipes including the highest ranked complementary ingredient.

12. The non-transitory computer-readable storage medium of claim 8, wherein the complementary ingredients are further scored based on frequency of occurrence in an online shopping cart associated with the user of the client device.

13. A computer system comprising:
a computer processor; and
a non-transitory computer-readable storage medium storage instructions that when executed by the computer processor perform actions comprising:
receiving, from a client device, a list of items in an online shopping cart associated with a user, wherein each item in the list is stored in an inventory of items available for the user to purchase, each item in the inventory associated with a user interface widget for adding the item to the online shopping cart;
determining key ingredients from the list of items by:
mapping each item of the list of items to a generic item by applying a machine-learned model to each item, wherein the machine-learned model analyzes a name of the item to determine an associated generic item; and
removing staple items from the mapped generic items, wherein staple items are items commonly used in recipes;
retrieving recipes that contain one or more of the key ingredients;
determining a set of complementary ingredients from the recipes, wherein each complementary ingredient is different from the key ingredients;

scoring each of the set of complementary ingredients based on a frequency of co-occurrence of the complementary ingredient and each of the one or more key ingredients in the recipes;

ranking user interface widgets associated with each of the complementary ingredients based on the scoring, wherein user interface widgets of complementary ingredients that co-occur with one or more of the key ingredients in the recipes are ranked higher than user interface widgets of complementary ingredients that do not co-occur with one or more of the key ingredients in the recipes;

selecting one or more of the highest ranked user interface widgets to recommend to the user;

sending, for display via a user interface presented at the client device, the selected user interface widgets;

receiving, from the client device, a selection of a user interface widget; and adding an item associated with the user interface widget to the list of items in the online shopping cart.

14. The computer system of claim 13, the actions further comprising:

removing non-ingredients from the mapped generic items, wherein non-ingredients include premade foods.

15. The computer system of claim 13, wherein the score for each complementary ingredient is the inverse of the number of the recipes including the complementary ingredient.

16. The computer system of claim 13, the actions further comprising:

sending, for display via the user interface at the client device, a subset of recipes including the highest ranked complementary ingredient.

* * * * *